Jan. 17, 1928.
E. C. WENTE
1,656,255
TALKING MOTION PICTURE PRODUCTION
Filed April 8, 1924
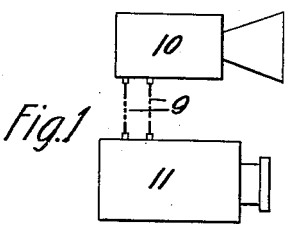
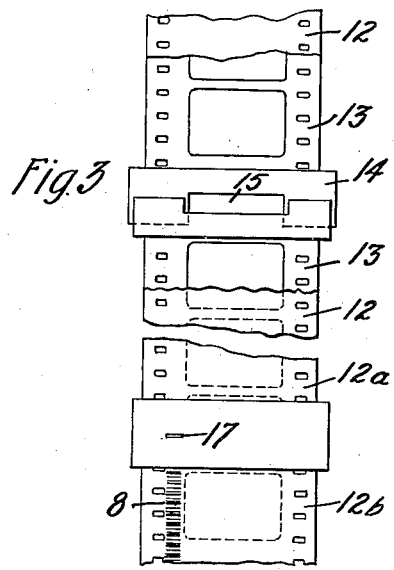
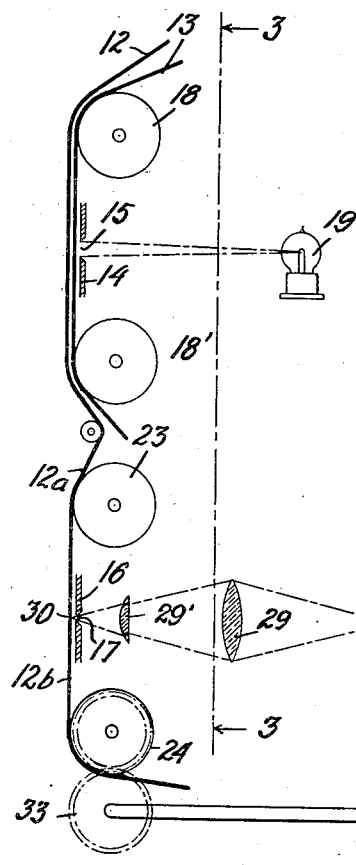
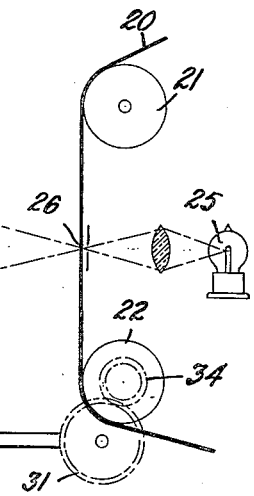
Inventor:
Edward C. Wente
by _____ Atty Patented Jan. 17, 1928.

1,656,255

UNITED STATES PATENT OFFICE.

EDWARD C. WENTE, OF NEW YORK, N. Y., ASSIGNOR TO WESTERN ELECTRIC COMPANY, INCORPORATED, OF NEW YORK, N. Y., A CORPORATION OF NEW YORK.

TALKING-MOTION-PICTURE PRODUCTION.

Application filed April 8, 1924. Serial No. 704,899.

This invention relates to the reproduction of variations of energy states, for example the reproduction of changes of scene and concurrent variations of sound as instanced in the making of talking motion pictures.

An object of the invention is to facilitate such reproductions.

A special object is to simply and effectively produce a plurality of records, at least one of which may be positive, of variations of different energy states, on one and the same record bearing medium—as, for instance to produce an effective kinetophonic film, or a positive motion picture film containing a photographic sound record in proper position to produce synchronism between the pictures and the sounds as reproduced.

For brevity and clearness, the invention is disclosed herein with especial reference to its application in the production of talking motion pictures, though it is not necessarily to be regarded as limited to that art.

It is an object of the invention to increase the upper limit of the sound frequencies which may be recorded on the positive picture film.

A further object is to obtain the desired contrast in the sound record on a positive picture film without unduly limiting the control of contrast in the positive pictures.

Another object is to eliminate objectionable noise due to the granular character of the emulsion on which the original sound record is made.

Another object is to obtain a sound record on a positive picture film and yet permit the camera and the sound recorder employed in making the original sound and picture records to be moved about independently and also permit the same camera to be used without alteration for both talking and silent motion pictures.

Another object is to obtain a sound record on a positive picture film and yet permit deletion of any portion of either the positive or the negative picture record without causing undue discordance between the pictures and sounds as finally reproduced.

A still further object is to photographically print a negative picture record and a sound record onto a homogeneous record medium and yet permit independent control of the exposure of these records during the printing.

In the embodiment of the invention specifically illustrated and described herein, these various objects are attained by recording the pictures and the sounds on two separate negative films, preferably with the sound film running faster than the picture film, and when these negatives have been developed, photographically printing them both on one and the same film, for instance in a manner described hereinafter.

Further objects of the invention will appear from the following detailed description and claims taken in connection with the accompanying drawings in which:

Fig. 1 represents a sound recorder and a camera for obtaining separate negative film records of concurrently varying sounds and scenes; Fig. 2 is a diagrammatic elevation, partly in section, of one form of apparatus for photographically printing the two negative records on a common film, to form a positive motion picture film carrying the sound record, this figure showing an edge view of the three films in operating relation to the printing apparatus; and Fig. 3 is a fragmentary section through line 3—3 of Fig. 2, looking in the direction of the arrows, with portions omitted, the front or face of the positive film and of the negative picture film appearing in Fig. 3.

In Fig. 1 a sound recorder 10, preferably of the type recording the sound as a series of striæ of various exposures, and a motion picture camera 11 are electrically connected as indicated at 9, and are driven synchronously, but preferably with the sound film running at a speed of the order of twice the speed of the picture film, supposing that the sounds to be recorded are speech, for instance. The desired film speed ratio can be obtained, for example, by properly adjusting the relative speeds of the motors (not shown) which drive the films, or by interposing the proper gears or the like (not shown) between the motors and the films. In reproducing changing scenes and sounds by the method involving the present invention, this camera and sound recorder or any other suitable means, are employed to obtain a negative motion picture film 13 (Figs. 2 and 3) and a phonographic film 20 (Fig. 2) containing a record of sounds concurrent with the scenes depicted on film 13, the sound film so obtained preferably having been run faster than the picture film during the recording, and preferably having recorded the sound as an exposed band with transverse striature such that after development of the film the band will exhibit striæ of various densities after the fashion fancifully indicated at 8 in Fig. 3.

These records after being properly developed and fixed, are photographically printed on a sensitized film 12, for instance as indicated in Figs. 2 and 3 and described hereinafter, with the printed records on film 12 so positioned with respect to each other as to produce synchronism between the pictures and the sounds when the film 12 is later passed through the proper picture projecting and sound reproducing apparatus (not shown), which may be of any suitable type. Where, as usual, the film is moved intermittently in its projection and the sound record moves continuously during its reproduction, the various portions of the sound record will ordinarily be printed not exactly opposite the corresponding pictures, but relatively displaced an amount approximately equal to the length of film between the portion of the picture being projected at any instant and the portion of the sound record being reproduced at that instant. If this displacement is made sufficiently small, any discordance between the pictures and sounds as finally reproduced, due to deletion of any length of the positive film necessitated for instance by damage to that film, will be substantially unnoticeable. This advantage can be attained by constructing the picture projecting and sound reproducing means so that the length of film between the picture being projected and the sound being reproduced is not greater than about four inches (a limitation easily satisfied) since with such a construction in the corresponding time displacement between the pictures and sounds as reproduced is only about a quarter of a second when the positive film with the usual 16 pictures per foot is run at the usual speed of 20 pictures a second. The editing of the film may all be done before a positive print is made, so that cutting out of any portion of the negative need result in none of the discordance which might be created if the sound record and the pictures were made on the same negative.

It is here pointed out that in a talking motion picture system heretofore proposed, in which the picture negatives and the negative sound record are made on one common film from which the picture positives and the positive sound record are printed on another common film, the minimum possible displacement between the picture and sound records on either film is greater than the minimum length of the positive film which it would be possible (by modification of the picture projector and sound reproducer) to preserve between the place at which the pictures are projected and the place at which the sound is reproduced; for the minimum possible displacement between the records is determined by the minimum possible length of the negative film between the place at which the pictures are recorded and the place at which the sound is recorded, and this length is influenced by the requirements of the construction of the camera and sound recorder, such as the requirement that the camera should be portable and the requirement that the film in the camera be carefully protected at all times against unintentional exposure to light, which have no counterpart in the requirements of the construction of the picture projector and sound reproducer.

In the operation of photographically printing the records carried by films 13 and 20 upon the film 12, the films 12 and 13, in contact with each other, pass downward over sprocket wheels 18 and 18', the film 12 being driven by a sprocket wheel 24 from a gear wheel 33 which derives its motion from a shaft 32 turned by a gear wheel 31 driven from any suitable source of power (not shown). In their downward travel the films pass an adjustable aperture 15 in a mat, screen or shutter 14. The film 13 is between the film 12 and the mat 14. A source of light 19, illuminating a portion of the film through aperture 15, causes the picture negatives carried by film 13 to be photographically printed on film 12 as positives. However, the mat 14 shields the left hand marginal portion of film 12 from the light source 19, as indicated in Fig. 3, thus reserving that portion of film 12 for the sound record which is to be printed on the film.

In Fig. 3 there is shown at 12$^a$ a length of the positive film 12 upon which pictures, fancifully indicated by dotted lines, but no portions of sound record, have been printed. Actually, of course, the picture positives would not be apparent before development of the film 12. By adjusting the shutter opening 15 the amount of light used in printing the negative pictures upon film 12 as positives can be regulated.

The picture positives having been printed on film 12, that film, preferably alone, travels downward over sprocket wheels 23 and 24, passing a slit or narrow aperture 17 in a mat 16. The sound negative 20 passes downward over sprocket wheels 21 and 22, sprocket 22 being driven from the gear 31 by means of a gear 34. In Fig. 2 a source of steady illumination is shown at 25, and an optical system is so arranged that an image of a narrow illuminated line on the negative sound film 20 at point 26 is obtained at point 30, for example by means of the lens 27, a narrow opening at point 28, a lens 29, and a cylindrical lens 29'. The function of lens 29' will be pointed out hereinafter. At the point 30 the narrow line image is photographed or printed upon a portion 12ª of the positive film 12. In Fig. 3 there is shown at 12ᵇ a length of the positive film 12 upon which both the picture and the sound records have been printed, as fancifully indicated. The gears 31 and 34 preferably drive the sprocket wheel 22 at such speed that the sound negative 20 moves faster than the portion 12ª or 12ᵇ of the film 12. The relative speeds should here be the same as the relative speeds used for the sound negative and the picture negative in making those records.

Both the sound record and the pictures having been printed on film 12, the film may be developed and the records fixed upon it.

As indicated above, the length of film 12 between apertures 15 and 17 should preferably be not greater than about four inches.

As pointed out above, one of the advantages of taking sound and picture records on separate negatives is that the sound film may, if desired, be run at greater speed than that customary for making picture films. The highest film speed possible in making the sound negative will depend upon the character of the films available. In general, it is necessary to employ a high speed film for this purpose in order to obtain sufficient exposure. With the type of high speed films at present available, it has been found desirable, particularly when recording sound involving frequencies of the order of several thousand cycles per second, to make the negative sound record at a film speed twice that commonly used in making the picture negative. As indicated above, this two to one ratio in the relative speeds of the negatives may be obtained, for example, by making proper adjustments in the speed of the motors driving the sound recorder and the camera, or by interposing the proper speed changing means between the motors and the negatives. As noted above, the same speed ratio which exists in the running of the sound and picture negatives while they are being made should preferably be maintained when the two negatives are driven for printing on the common positive. This may be done, for example, by making the size of the driving gear of the sprocket wheel 22 half as large as the gear on sprocket wheel 31, as shown in Fig. 2 and indicated in the description above.

One of the chief advantages of making the sound record on a negative running at twice the speed of the motion picture film results from the fact that a photographic emulsion of high sensitivity has inherently a coarse grain structure. For instance, the Eastman super-speed motion picture film has such a coarse granular structure that its resolution is only about half as great as that of the Eastman positive motion picture film. The upper limit of frequencies that may be recorded will, therefore, be twice as great for the positive as for the negative film for the same linear speed; or in other words, the same range of frequencies may be recorded on the positive at one half the speed of the negative.

For correct sound reproduction it is important that the development of the positive and negative be so carried out that the transmission of the positive is at every point proportional to the exposure of the negative. This is in general not the best condition for the pictures as under these circumstances they will usually be too harsh. In the system here proposed the picture negative and positive can be developed to give the most pleasing results for pictures, and yet the negative of the sound record can be so developed that when it is printed on the picture positive film, the required contrast is obtained in the positive sound record.

In order to get strict proportionality between illumination of the negative and transmission of the printed positive, in addition to proper development it is desirable that the exposure of both positive and negative shall always remain on the straight part of the characteristic curves of the photographic emulsions. Even with high power lenses and an intense source of steady illumination it has been found desirable to use a super-speed film for the sound negative in recording speech, for instance, in order to bring the illumination up to the point where the exposure falls on the straight portion of the characteristic curve. Now this ultra speed film has a coarse granular structure. The granular structure of the film tends to result in an accompanying noise in the reproduction, which is very similar to the scratch of the needle of the ordinary phonograph. A way of reducing this noise is to increase the width of the record; the effect of the individual grains on the light transmission during reproduction will then average out more nearly. The space available for a sound record on the picture film is, however, limited, so that a wide record is ordinarily not feasible. By the use of a printer such as is here described the effect of the grain size in the negative may be eliminated. A wide record may be made on the negative, the print of which on the positive may then be reduced by means of the optical system to the required width. The imprint on the positive of the individual grains in the negative will thereby be greatly reduced. If a cylindrical lens be interposed in the optical system, for instance as indicated at 29', no sharp image of the grains in the negative will be formed and they will not be reproduced on the positive, whereas, if a contact print were made the coarse grains of the negative would be reproduced on the positive. Since the speed of the positive affects only the speed at which prints can be made, an emulsion of very fine granular structure can be used and scratching noise in the reproduction can thus be reduced to a minimum.

Due to variations in lighting conditions and in the character of the objects being photographed, motion picture negatives may vary greatly in density throughout the length of a single roll of film. It is customary to correct for this by varying the intensity of the light used for making positive records from the negatives. Sound records on negative films, on the other hand, may be produced under more easily controllable conditions, so that usually no such correction is required or desirable, or if required the correction will be different from that of the corresponding portion of the picture record. In accordance with this invention a separate lighting means is used for the picture and sound records, respectively, during the printing. With this arrangement the exposure of the positive motion picture record can be varied, as for instance by varying the width of the opening 15 in the manner common in the art, or varying the intensity of the light 19 by any known or suitable means (not shown), without correspondingly varying the exposure of the sound record, and if desired the exposure of the sound record can be independently varied. It is of course possible to simultaneously vary the width of the opening 15 and the intensity of the light from source 19, to vary the exposure of the films 13 and 12 to the light from source 19.

The optical system diagrammed in Fig. 2 is a practical one; but the results attained thereby can be achieved in various ways. Similarly, although Figs. 2 and 3 show one practical arrangement for printing the negative pictures on the positive film, it is to be understood that other means, for instance a standard step-by-step printer, might be employed, part of the positive film being masked, however, as in the arrangement shown in Figs. 2 and 3, to leave sufficient space for the sound record. In fact, the principles of the invention claimed may be embodied in many organizations differing from those specifically illustrated and described.

What is claimed is:

1. A process of forming sound and motion picture records which consists of forming a photographic negative record of a changing scene, forming a photographic negative record of the sound accompanying the scene, with the sound negative running at a speed of the order of twice that of the picture negative, and simultaneously printing said records on a single positive film with the sound negative running at a speed of the order of twice that of the picture negative.

2. The method of producing a combined sound and moving picture record on the same film, which consists in forming a photographic negative of the changing scene, forming a photographic negative record of the sound accompanying the scene with the sound record running at a greater speed than the picture negative, and simultaneously printing the two records on a single positive film while maintaining the same relative speeds of the two negatives as in recording.

3. The method of producing a combined sound and moving picture record on the same film, which consists in forming a photographic negative of the changing scene, forming a photographic negative record of the sound accompanying the scene on a high speed negative film run at about double the speed of the negative of the changing scene and simultaneously printing the two negative records on different portions of a positive film while running the two negatives at the same relative speed as in recording.

4. The method of producing a synchronized sound and moving picture record on the same film, which consists in forming a photographic negative of the changing scene, simultaneously forming a photographic negative of the sound accompanying the scene on a negative film run at approximately double the speed of the picture negative and simultaneously printing the two negatives on a positive film, the picture by contact and the sound through an optical system while maintaining the same relative speed of the negative as in recording.

In witness whereof, I hereunto subscribe my name this 1st day of April, A. D. 1924.

EDWARD C. WENTE.